(12) United States Patent
Brust et al.

(10) Patent No.: US 9,394,831 B2
(45) Date of Patent: Jul. 19, 2016

(54) TURBOMACHINE DRIVE ARRANGEMENT

(75) Inventors: Eric A. Brust, Machesney Park, IL (US); Glenn C. Lemmers, Jr., Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 527 days.

(21) Appl. No.: 13/411,920

(22) Filed: Mar. 5, 2012

(65) Prior Publication Data
US 2012/0159960 A1 Jun. 28, 2012

Related U.S. Application Data

(63) Continuation-in-part of application No. 12/785,532, filed on May 24, 2010.

(60) Provisional application No. 61/340,418, filed on Mar. 17, 2010.

(51) Int. Cl.
*F02C 7/268* (2006.01)
*F02C 7/275* (2006.01)

(52) U.S. Cl.
CPC .............. *F02C 7/268* (2013.01); *F02C 7/275* (2013.01); *Y02T 50/671* (2013.01)

(58) Field of Classification Search
CPC ............ F02C 7/26; F02C 7/275; F02C 7/277; F01D 17/08; F01D 17/04; B60K 17/14; B60K 17/105; F16H 39/14
USPC ......... 60/788, 778, 625, 39.113, 786, 39.141, 60/39.142, 487
See application file for complete search history.

(56) References Cited

U.S. PATENT DOCUMENTS

| | | | |
|---|---|---|---|
| 3,286,543 A | 11/1966 | Porter | |
| 3,324,739 A | 6/1967 | Brueder | |
| 3,367,109 A | 2/1968 | Troeger et al. | |
| 3,970,163 A | 7/1976 | Kinoshita | |
| 4,315,442 A * | 2/1982 | Cordner | 475/72 |
| 4,383,647 A | 5/1983 | Woodruff et al. | |
| 4,743,776 A | 5/1988 | Baehler et al. | |
| 4,922,119 A * | 5/1990 | Raad et al. | 290/31 |
| 4,960,085 A * | 10/1990 | Coons | 123/179.31 |
| 5,145,324 A | 9/1992 | Dickes et al. | |

(Continued)

FOREIGN PATENT DOCUMENTS

GB 842916 10/1960

OTHER PUBLICATIONS

Combined Search and Examination Report, dated Jun. 23, 2011, GB Application No. 1104557.2.

*Primary Examiner* — Craig Kim
(74) *Attorney, Agent, or Firm* — Carlson, Gaskey & Olds, P.C.

(57) ABSTRACT

An example arrangement for driving a turbomachine includes an input shaft that is configured to rotate a rotor of the turbomachine through a hydraulic log and gear differential rotatable coupled to the input shaft. A motor-generator is rotatably coupled to the differential. The motor-generator has a motor mode of operation and a generator mode of operation. The motor-generator is configured to drive the input shaft through the hydraulic log and differential when the motor-generator is in the motor mode of operation. The input shaft is configured to drive the motor-generator through the hydraulic log and differential when the motor-generator is in the generator mode of operation.

17 Claims, 8 Drawing Sheets

(56) References Cited

U.S. PATENT DOCUMENTS

| | | |
|---|---|---|
| 5,271,285 A | 12/1993 | Silliman, Jr. et al. |
| 5,867,979 A | 2/1999 | Newton et al. |
| 6,036,374 A | 3/2000 | Fisher et al. |
| 6,145,308 A | 11/2000 | Bueche et al. |
| 6,287,086 B1 | 9/2001 | Steen |
| 6,838,778 B1 | 1/2005 | Kandil et al. |
| 6,838,779 B1 | 1/2005 | Kandil et al. |
| 6,995,478 B2 | 2/2006 | Xu et al. |
| 7,105,937 B2 | 9/2006 | Hoppe et al. |
| 7,116,003 B2 | 10/2006 | Hoppe |
| 7,250,688 B2 | 7/2007 | Thomson et al. |
| 7,468,564 B2 | 12/2008 | Crisafulli |
| 7,647,778 B2 | 1/2010 | Zewde et al. |
| 7,997,879 B2 | 8/2011 | Bergmann |
| 2008/0098732 A1* | 5/2008 | Grosskopf et al. ............ 60/487 |

* cited by examiner

TURBOMACHINE DRIVE ARRANGEMENT

CROSS-REFERENCE TO RELATED APPLICATIONS

This application is a continuation-in-part patent application to U.S. patent application Ser. No. 12/785,532, filed 24 May 2010, which claims priority to U.S. Provisional Application No. 61/340,418, filed on 17 Mar. 2010. Application Ser. Nos. 12/785,532 and 61/340,418 are both incorporated herein by reference.

BACKGROUND

This disclosure relates generally to a drive arrangement for a turbomachine. More particularly, this disclosure relates to an arrangement that drives the turbomachine during a first mode of operation and generates electric power using the turbomachine in a second mode of operation.

Turbomachines, such as gas turbine engines are known. A typical turbomachine includes multiple sections, such as a fan section, a compression section, a combustor section, and a turbine section. Many turbomachines, particularly gas turbine engines, have large rotors in the compression section that must be accelerated to high rotational speeds until the rotor is rotating fast enough to sustain operation of the turbomachine. Typically, a motor separate from the turbomachine drives an input shaft that is used to accelerate the rotors.

Many turbomachines use generators to produce electric power for various components, such as components on an aircraft. Some turbomachines use generators separate from the motor that drives the rotors. Integrated drive generators (IDGs) are an example of this type of generator, which can produce constant frequency electric power. As can be appreciated, the generator separate from the motor undesirably adds weight and complexity to the turbomachine.

Other turbomachines use the motors as generators after the turbomachine is self-sustaining. The turbomachine drives these generators. A variable frequency starter generator (VFSG) is an example of this type of generator. VFSGs generate electric output power with a frequency that is proportional to the turbomachine speed. Electrical usage equipment must then be capable of operating under this variable frequency input, which generally increases their weight, envelope, power losses, and cost. Some arrangements of this type include complicated shafting, gearing, clutching, or valving to enable both start and generate modes of operation.

SUMMARY

An example hydraulic log valve assembly includes a valve that controls a flow of fluid within a hydraulic log to provide a rotational output from the hydraulic log that is different than a rotational input to the hydraulic log.

An example gas turbine engine assembly includes a motor-generator, a compressor rotor, and a hydraulic log. The hydraulic log receives a rotational input from the motor-generator or the compressor rotor. The hydraulic log provides a rotational output to the other of the motor-generator or the compressor rotor. A valve adjusts flow between areas of the hydraulic log to selectively adjust the speed of the rotational output relative to the speed of the rotational input and maintain a relatively constant and safe working pressure.

An example method of driving components within a turbomachine includes providing a first rotational input to a hydraulic log using a motor-generator when the motor-generator is in a motor mode of operation. The method uses a valve that controls flow within a hydraulic log to adjust the first rotational input to a second rotational input that drives a compressor rotor.

These and other features of the disclosed examples can be best understood from the following specification and drawings, the following of which is a brief description:

DETAILED DESCRIPTION

Figure 1:
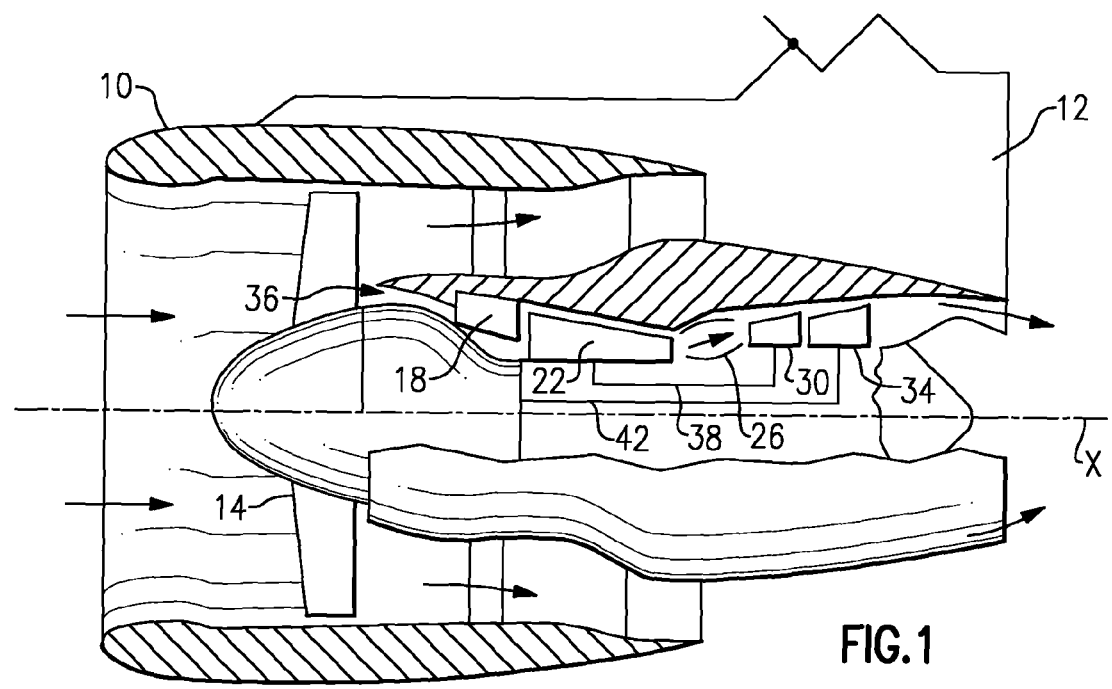
FIG. 1 shows a section view of an example gas turbine engine.
Figure 2:
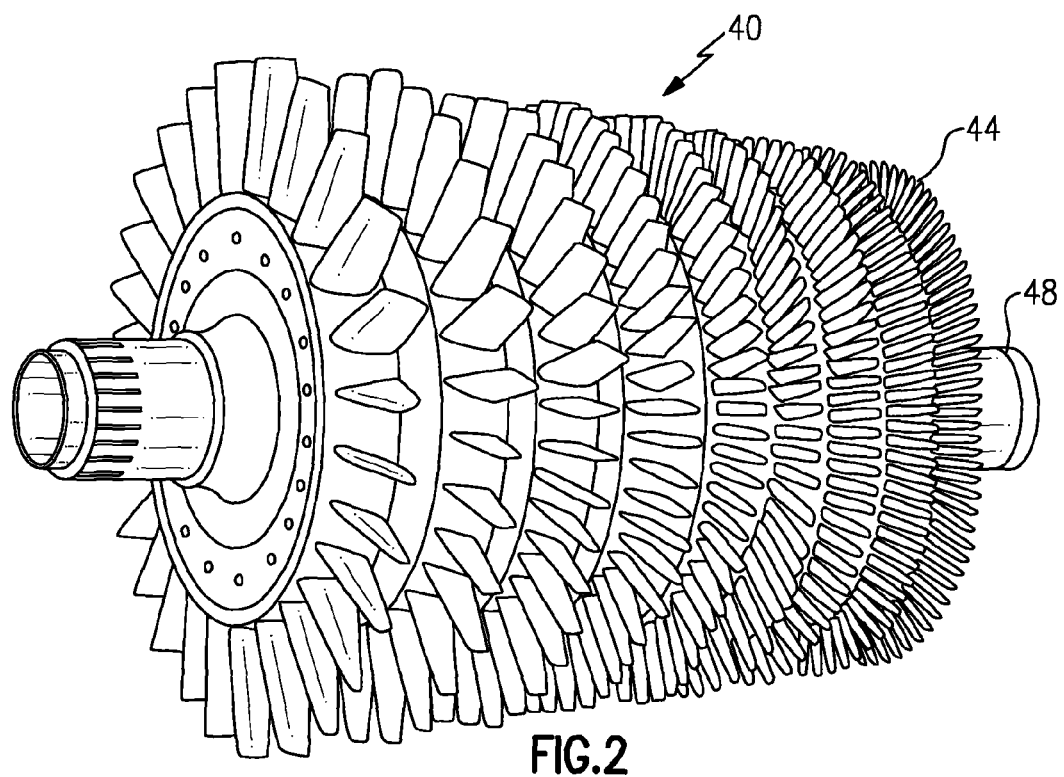
FIG. 2 shows an example rotor assembly of the FIG. 1 engine.

Referring to FIGS. 1 and 2, an example gas turbine engine 10 is used to propel an aircraft 12. The gas turbine engine 10 is an example type of turbomachine.

The example gas turbine engine 10 includes (in serial flow communication) a fan section 14, a low pressure compressor 18, a high pressure compressor 22, a combustor 26, a high pressure turbine 30, and a low pressure turbine 34. The gas turbine engine 10 is circumferentially disposed about an engine axis X.

During operation, air is pulled into the gas turbine engine 10 by the fan section 14. Some of the air moves through a flow path 36 to a core of the gas turbine engine 10. The air moving through the flow path 36 is pressurized by the compressors 18 and 22, mixed with fuel, and burned within the combustor 26. The turbines 30 and 34 extract energy from the hot combustion gases flowing from the combustor 26.

In a two spool design, the high pressure turbine 30 utilizes the extracted energy from the hot combustion gases to power the high pressure compressor 22 through a high speed shaft 38, and the low pressure turbine 34 utilizes the extracted energy from the hot combustion gases to power the low pressure compressor 18 and the fan section 14 through a low speed shaft 42.

The examples described in this disclosure are not limited to the two spool engine architecture described, however, and may be used in other architectures, such as single spool axial design, a three spool axial design, and still other architectures. Further, although the examples described herein are described with regard to the gas turbine engine 10, those having skill in this art and the benefit of this disclosure will understand that other examples include other types of turbomachines.

As known, the compressor sections 18 and 22 include a rotor assembly 40 having blades 44 connected to a shaft 48. Rotating the shaft 48 rotates the rotor blades. The rotor blades 44, when rotated, compress the air moving through the flow path 36.

Figure 3:
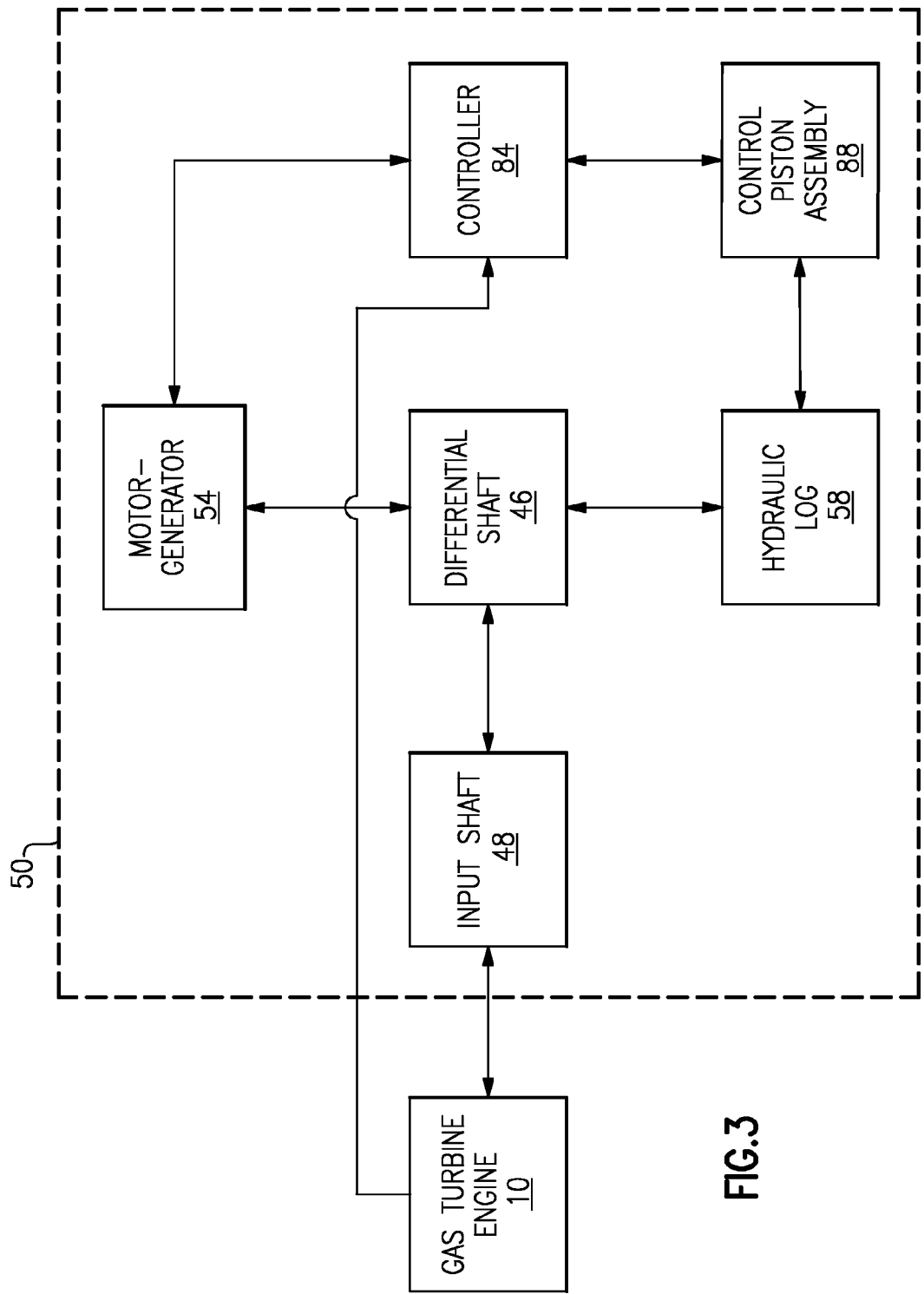
FIG. 3 shows a highly schematic view of an arrangement for driving the FIG. 1 engine.

The rotor assembly 40 rotates to compress air within the compressor sections 18 and 22 during start-up of the engine 10. A motor-generator 54 continues to drive rotation of the rotor assembly 40 until the rotor assembly 40 reaches a speed capable of compressing enough air to sustain operation of the engine 10. Once the engine 10 is self-sustaining, the turbines 30 and 34 are able to suitably drive the rotor assembly 40 without requiring the rotational input from the motor-generator 54 (FIG. 3). In this example, the motor-generator 54 operates as a generator after the engine 10 has reached self-sustaining speed.

Referring to FIG. 3, an arrangement 50 for driving the engine 10 of FIG. 1 includes the motor-generator 54, a hydraulic log 58, and a gear differential 46. The motor-generator 54 provides the rotational input to the hydraulic log 58 and differential 46 during start-up of the engine 10.

Once the engine 10 is self-sustaining, the engine 10 is configured to rotate the arrangement's input shaft 48, rather than the input shaft 48 rotating portions of the engine 10. When the engine 10 rotates the input shaft 48, the hydraulic log 58 is configured to provide a rotational input to the differential 46. The differential 46 then provides a rotational input to the motor-generator 54 so that the motor-generator 54 can operate as a generator and provide power in a known manner. The aircraft 12 utilizes power from the motor-generator 54 to operate various devices on the aircraft 12.

As can be appreciated, a relatively consistent supply of power from the motor-generator 54 is required. Variations in the rotational speed of the input shaft 48 would vary the power output from the motor-generator 54 were it not for the hydraulic log 58. The hydraulic log 58, in this example, accommodates the varying rotational speeds of the input shaft 48 and provides the motor-generator 54 with a relatively consistent rotational input such that the motor-generator 54 is able to provide a relatively consistent frequency source of power to the aircraft 12.

In one example, the hydraulic log 58 receives the rotational input from the motor-generator 54 during start-up of the engine 10. The hydraulic log 58 then provides a rotational output to the input shaft 48. The hydraulic log 58 adjusts the rotational input to a rotational output suitable for driving the engine 10. A person having skill in this art would understand a rotational output suitable for driving the input shaft 48 during start up of the engine 10.

The hydraulic log 58 accommodates variability in the rotational output provided by the motor-generator 54 during motor mode and the rotational input provided by the engine 10 during generator mode.

Figure 4:
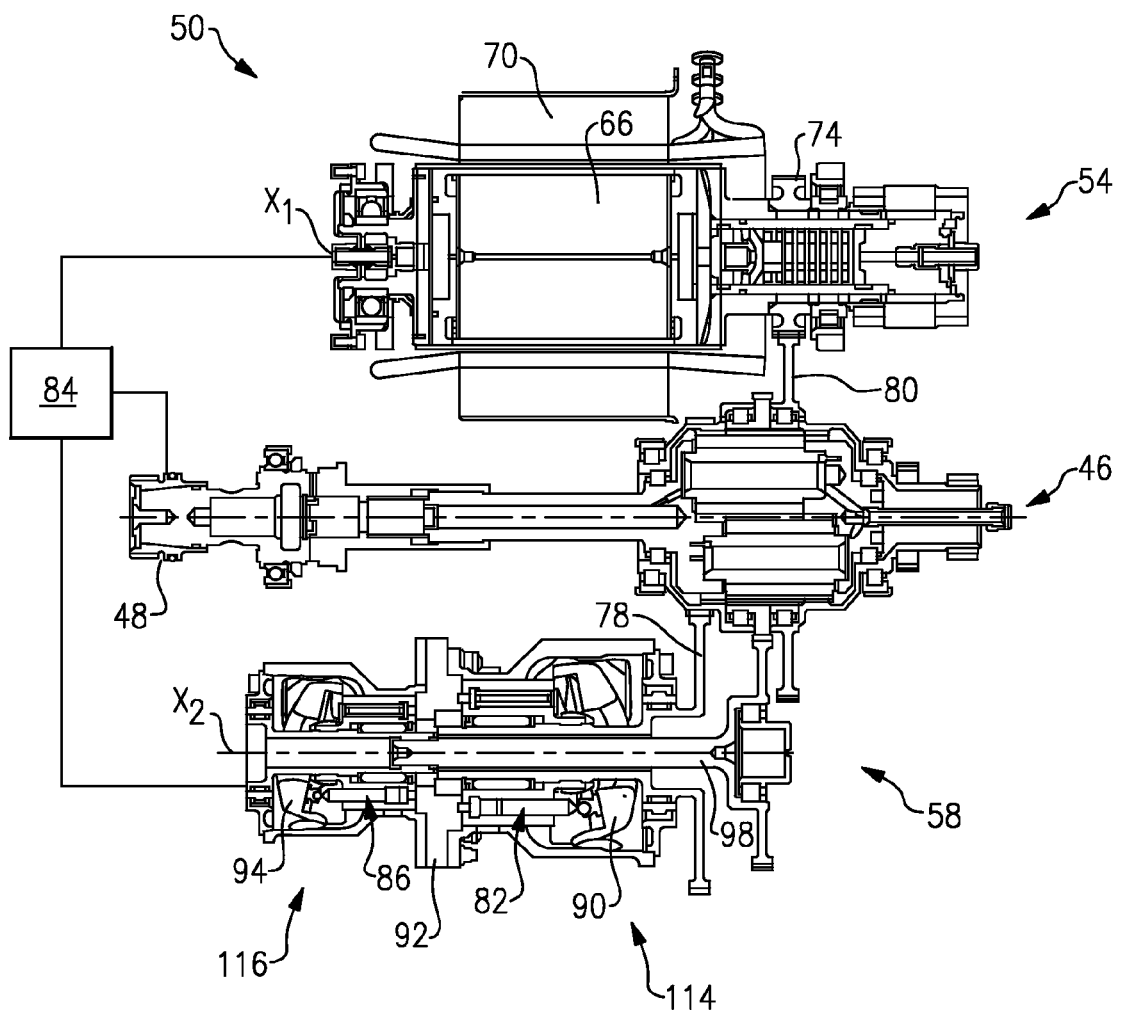
FIG. 4 shows a more detailed view of the FIG. 3 arrangement.

Referring now to FIG. 4 with continuing reference to FIG. 3, the motor-generator 54 in the example arrangement 50 includes a rotor 66 and stator 70 arranged about a motor centerline $X_1$. The motor-generator 54 rotates a gear 74 that is rotatably coupled to the differential 46.

The hydraulic log 58 includes a first plurality of pistons 82 and a second plurality of pistons 86. A wobbler plate 90 controls the stroke length of the first plurality of pistons 82. The wobbler plate 90 is adjusted relative to an axis $X_2$ of the hydraulic log 58 to change the stroke lengths of the plurality of pistons 82. A wobbler plate 94 controls the stroke lengths of the second plurality of pistons 86. The wobbler plate 94 is adjusted relative to the axis $X_2$ of the hydraulic log 58 to change the stroke lengths of the second plurality of pistons 86.

When the gas turbine engine 10 is driving the arrangement 50 to produce electric power in generate mode, adjusting the strokes of the first plurality of pistons 82 and the second plurality of pistons 86 adjusts the rotation of a gear 78 relative to the rotation of the hydraulic log shaft 98. The hydraulic log 58 is thus able to step up or step down rotation of gear 78 relative to the input shaft 48 speed by varying the positions of the wobbler plates 90 and 94. The gear differential 46 sums the speed of gear 78 and the speed of the input shaft 48 and produces a resultant output speed on gear 80 to drive the motor-generator 54. The relationship between the speed of gear 78, the speed of input shaft 48, and the speed of gear 80 is constant and is determined by the relative number of teeth on the gears within the differential 46. Proper control of gear 78 speed relative to the input shaft 48 speed produces a constant speed on gear 80 and on the motor-generator 54. Constant speed on the motor-generator 54 produces a constant frequency electric power output from the arrangement 50.

In this example, a controller 84 controls the positions of wobbler plates 90 and 94 via a control piston assembly 88 connected to each wobbler plate. For example, if the gear 74 is rotating too fast to supply constant frequency power from the motor-generator 54, the controller 84 initiates an adjustment to at least one of the wobbler plates 90 or 94 that causes gear 78 to slow its rotation. As can be appreciated, slowing the rotation of gear 78 slows rotation of gear 74 thru the gear differential 46.

Figure 5:
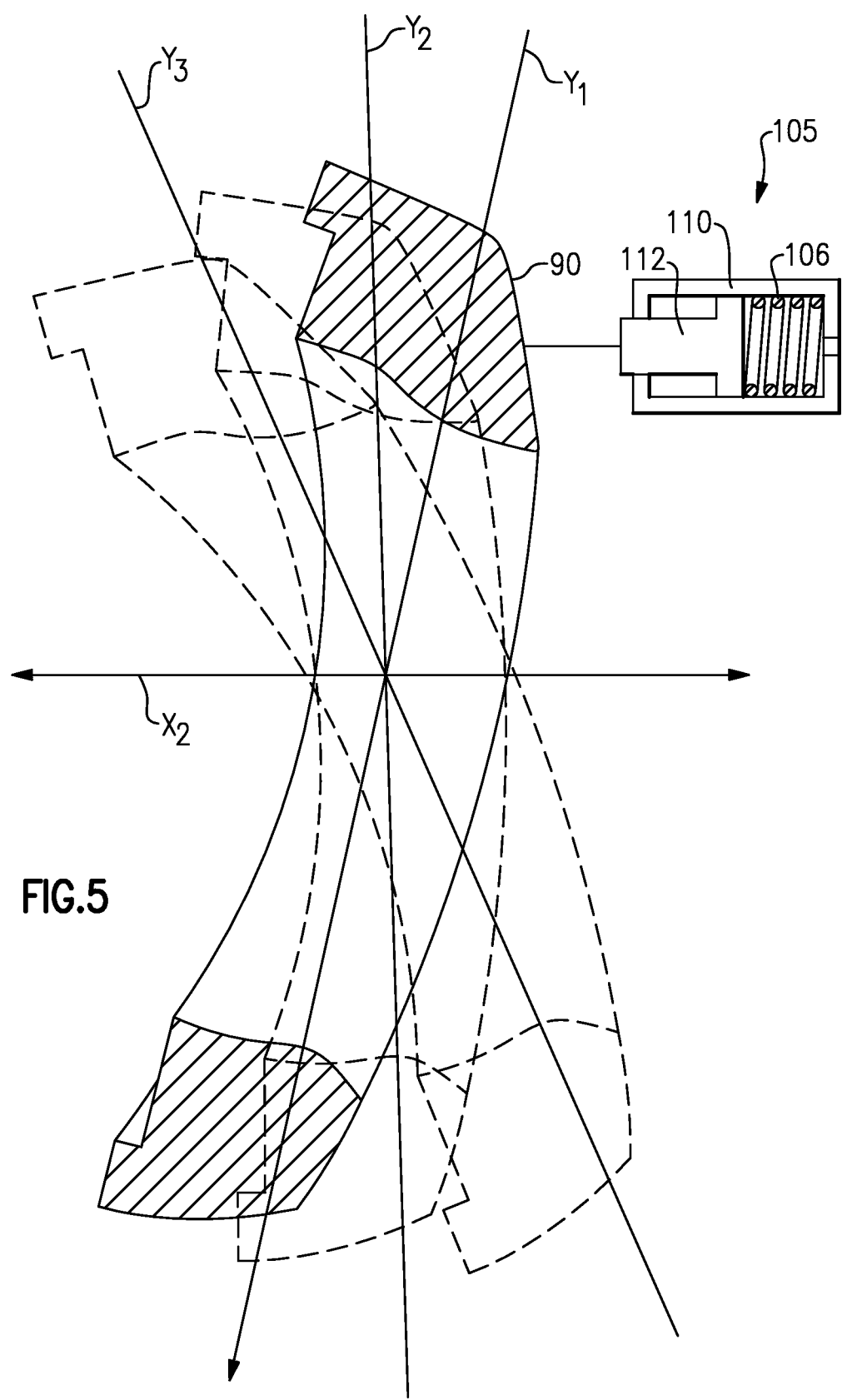
FIG. 5 shows a close-up schematic view of a wobbler plate within the FIG. 4 hydraulic log.

Referring now to FIG. 5 with continuing reference to FIG. 4, the wobbler plates 90 and 94 are connected to individual control piston assemblies 88 to enable movement over the range bounded by lines $Y_1$ and $Y_3$. The controller 84 varies the position of the wobbler plates 90 and 94 by varying the hydraulic pressure acting on the control pressure side of the piston 110. The control piston assemblies 88 include biasing forces in the form of a spring 106 and hydraulic pressure against a piston 112.

During start-up of the gas turbine engine 10, the stator 70 of the motor-generator 54 is connected to an external electric power source. The external power source causes the motor-generator 54 to act as an electric motor and accelerates the rotor 66. During acceleration of the rotor 66, the controller 84 initiates an adjustment to at least one of the wobbler plates 90 or 94 that allows the rotor 66 to accelerate while the input shaft 48 is stationary. In this mode, the hydraulic log 58 essentially free-wheels and provides minimal resistance to the motor-generator 54. This allows the rotor 66 to be accelerated with minimal drag torque and essentially declutches the rotor 66 from the input shaft 48 during initial acceleration. A person having skill in this art would understand how this would allow significant size and weight savings for both the motor-generator 54 and the external electric power source.

Once the rotor 66 is accelerated to synchronous speed, it is available to provide significant torque to the input shaft 48 to start the gas turbine engine 10. At this point, the controller 84 initiates adjustments to wobbler plate 90 to cause this half of the hydraulic log 58 to function as a hydraulic pump. Controller 84 controls wobbler plate 94 to cause this half of the hydraulic log 58 to function as a hydraulic motor in response to the working pressure generated by the plurality of pistons 82. Since the plurality of pistons 86 are stationary at the start of this sequence, working pressure rises as the plurality of pistons 82 pump oil against them.

The mechanical torque produced by the plurality of pistons 86 is transmitted via gear shaft 98 to the differential 46. The gradual addition of torque to the differential 46 causes the input shaft 48 to accelerate and gear 78 to decelerate. Acceleration of input shaft 48 causes the gas turbine engine 10 to accelerate. During acceleration, the hydraulic working pressure in hydraulic log 58 needs to be maintained to a level suitable for acceleration of the gas turbine engine 10. The torque on the input shaft 48 peaks when the portion of the hydraulic log with wobbler plate 90 reaches maximum displacement, for example. The remainder of the start cycle is then maintained at a constant power by limiting current to the motor-generator 54.

As the example gas turbine engine 10 reaches self-sustaining operation, the controller 84 initiates adjustments to wobbler plate 90 which cause that half of the hydraulic log 58 to transition to a hydraulic motor. Simultaneously, the controller 84 initiates adjustments to wobbler plate 94 which cause that half of the hydraulic log 58 to transition to a hydraulic pump. Essentially, the two halves of the hydraulic log 58 switch roles as they transition from start mode to generate mode.

Once in generate mode, wobbler plate 90 is held in a position aligned with line $Y_1$ by the hydraulic bias pressure within control piston assembly 88. In generate mode, controller 84 senses output frequency of the motor-generator 54 and varies the control pressure acting on the control piston assembly 88 to adjust the position of wobbler plate 94 as necessary to maintain a consistent speed of the motor-generator 54.

In one example, the controller 84 senses current to the motor-generator 54 to regulate movement of the wobbler plates 90 and 94 during the transition from start to generate mode. If the wobblers 90 and 94 are repositioned too fast, the motor-generator 54 current may undesirably climb. Further, if the wobbler plates 90 and 94 are repositioned too slow, the gas turbine engine 10 start could stall. A person skilled in this art could establish a proper relationship between the decay of current to the motor-generator 54 and the working pressure in the hydraulic log 58.

In this example, the position of the wobbler plate 90 when aligned with the line $Y_2$ corresponds to a motor-generator 54 acceleration mode of operation. The position of the wobbler plate 90 when aligned with line $Y_1$ corresponds to a normal generator mode of operation. The position of wobbler plate 90 when between line $Y_2$ and $Y_3$ corresponds to a start mode of operation during which the gas turbine engine 10 is being accelerated.

Figure 6:
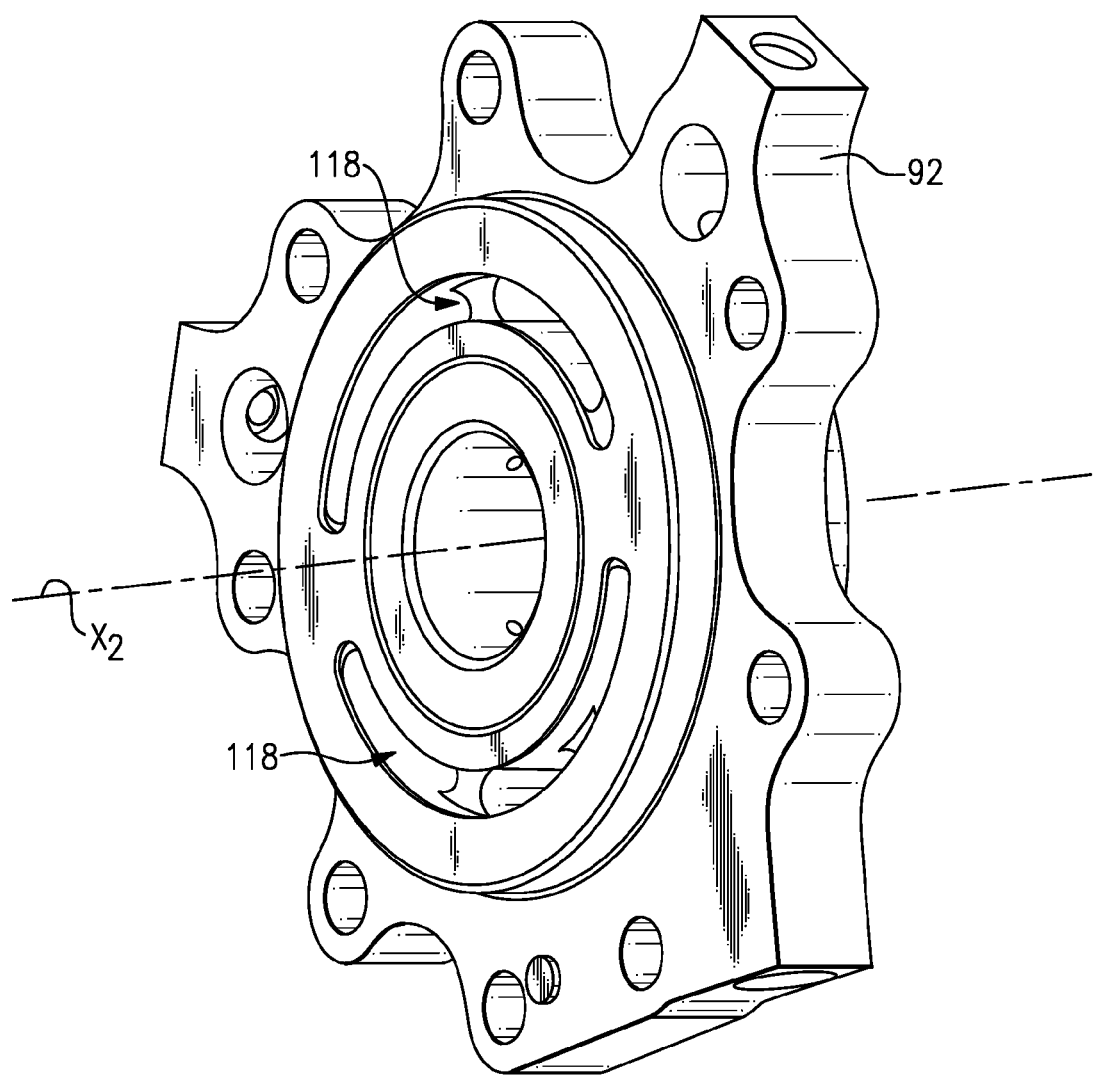
FIG. 6 shows a perspective view of an example port plate within the hydraulic log of the FIG. 3 arrangement.
Figure 7:
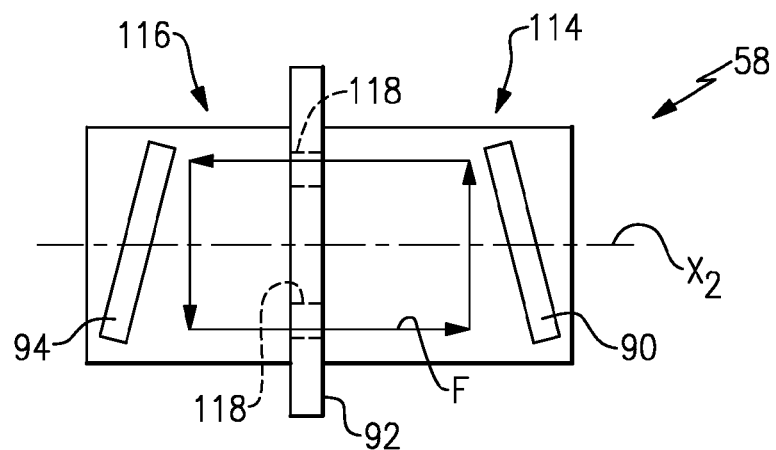
FIG. 7 shows a highly schematic view of the hydraulic log within the FIG. 3 arrangement.

Referring to FIGS. 6 and 7 with continuing reference to FIGS. 4 and 5, a port plate 92 separates the hydraulic log 58 into a first portion 114 (or half) that includes the wobbler plate 90 and a second portion 116 (or half) that includes the wobbler plate 94.

As can be appreciated, when the wobbler plates 90 and 94 are positioned as shown in FIG. 7 and the plurality of pistons 82 are rotated, the hydraulic fluid F in the area above the axis $X_2$ will increase in pressure and act upon the plurality of pistons 86 through the port plate 92.

Openings 118 in the port plate 92 permit flow of hydraulic fluid between the first portion 114 and the second portion 116. When the wobbler plates 90 and 94 are positioned as shown in FIGS. 4 and 7, the openings 118 above the axis $X_2$ may communicate high pressure fluid from the first portion 114 to the second portion 116, and the openings 118 below the axis $X_2$ communicate low pressure fluid from the second portion 116 to the first portion 114. The positioning of the wobbler plates 90 and 94 depends on whether the first portion 114 is operating as a pump or a motor, and whether the second portion 116 is operating as a pump or a motor depending of the direction of power flow and if the machine is in start or generate mode. Adjusting the positions of the wobbler plates 90 and 94 adjusts the rotational speed of the motor-generator 54 relative to the input shaft 48. Thus, both the valve 130, the wobbler plates 90 and 94, or both, may be used to adjust the speed of the motor-generator 54 relative to the input shaft 48, rather than exclusively the wobbler plates 90 and 94.

Figure 8:
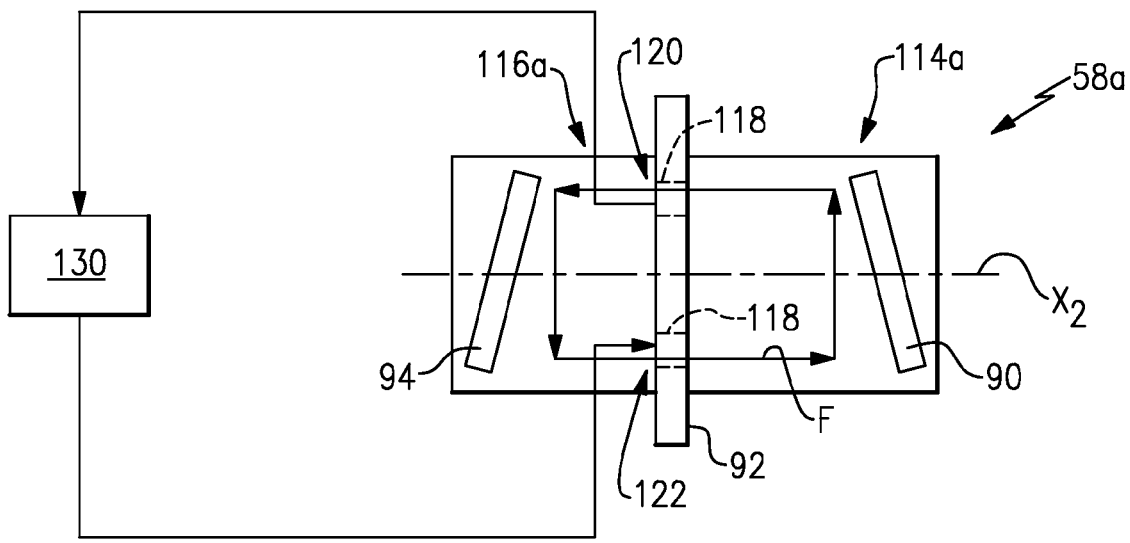
FIG. 8 shows a highly schematic view of another arrangement for driving the FIG. 1 engine.
Figure 9:
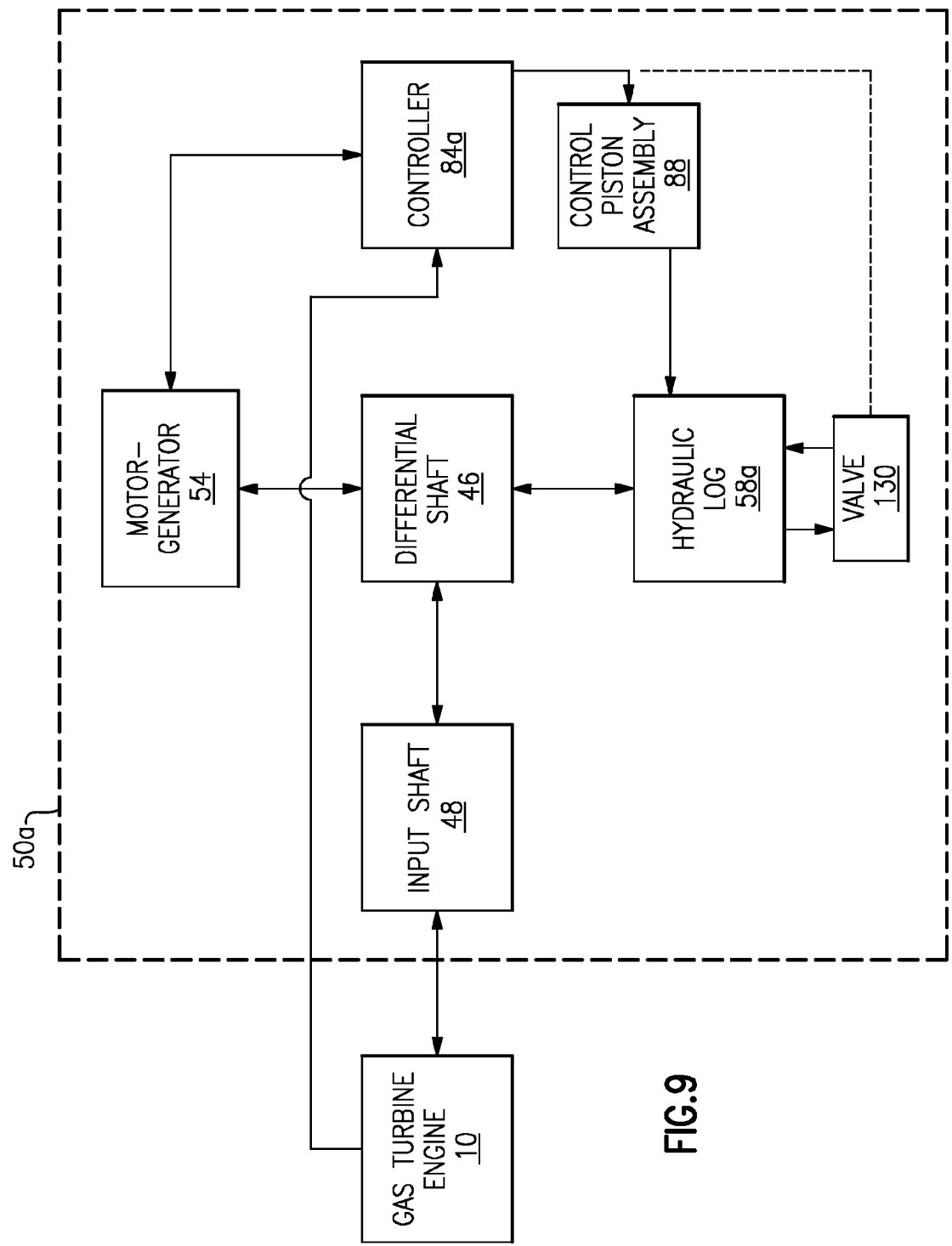
FIG. 9 shows a highly schematic view of a hydraulic log within the FIG. 8 arrangement.

Referring now to FIGS. 8 and 9, in another example arrangement 58*a*, a controller 84*a* controls a valve 130 to adjust the speed of the motor-generator 54 relative to the input shaft 48. In such an example, a hydraulic log 58*a* generally includes a higher (working) pressure area 120 and a lower pressure area 122. These portions alternate being above or below the axis $X_2$ depending on whether the first portion 114 is operating as a pump or a motor, and whether the second portion 118 is operating as a pump or a motor, and if operating in start or generate mode.

The valve 130 selectively permits fluid to move from the higher pressure area 120 of the hydraulic log 58 to the lower pressure area 122. In so doing, the valve 130 regulates the working pressure and adjusts the relative differences in the rotational speed between the input shaft 48 and the motor generator 54 without requiring adjustments to either of the wobbler plates 90 or 94. The working pressure in the hydraulics of the hydraulic log 58*a* during start-up is a function of the torque being generated, the set displacement of the 'motoring' side (amount of stroke on variable unit during start), and the difference in actual rotational speeds of the hydraulic units from the speeds commanded by the stroke.

The valve 130 of the arrangement 58*a* may be used instead of, or in addition to, the control piston assembly 88.

In the arrangement 50 (FIG. 3), the portion of the hydraulic log 58 functioning as a pump has a rate of change in displacement that is set by the rate which would set a constant working pressure during start-up.

As the engine 10 accelerates, the hydraulic unit driving the engine 10 speeds up causing working pressure within the hydraulic log 58 to decrease. The stroke of pistons in this portion of the hydraulic log 58 automatically advances in response to reduced bias pressure, which causes an increase in speed, torque, and working pressure until reaching a set bias level. This set bias level sets the maximum working pressure to safe limits, but also limited the amount of torque produced at certain speeds because the stroke (displacement) was limited to provide the safe working pressure limits. During the start, the torque generated would change as the displacements (stroke) of the hydraulic units changed, even though working pressure remained nearly constant.

In the arrangement 50*a*, the bias pressure on the back side of the control piston 88 may be replaced with the valve 130. Thus, there is no longer any feedback in the control piston 88 to working pressure. This characteristic allows the displacement (stroke) to be set to a maximum and held there during the start-up, and allow the valve 130 to regulate the working pressure.

As the engine 10 accelerates and the difference in flow provided by 'pumping' side of the hydraulic log 58*a* and the flow consumed by 'motoring' side decreases, the flow across the valve 130 drops, but constant pressure is maintained. Since the displacements of the hydraulic units are maintained at near maximum during the duration of the start-up, and pressure is maintained at maximum allowed by valve 130, the torque produced is held approximately constant at the maximum during the entire start-up.

Figure 10:
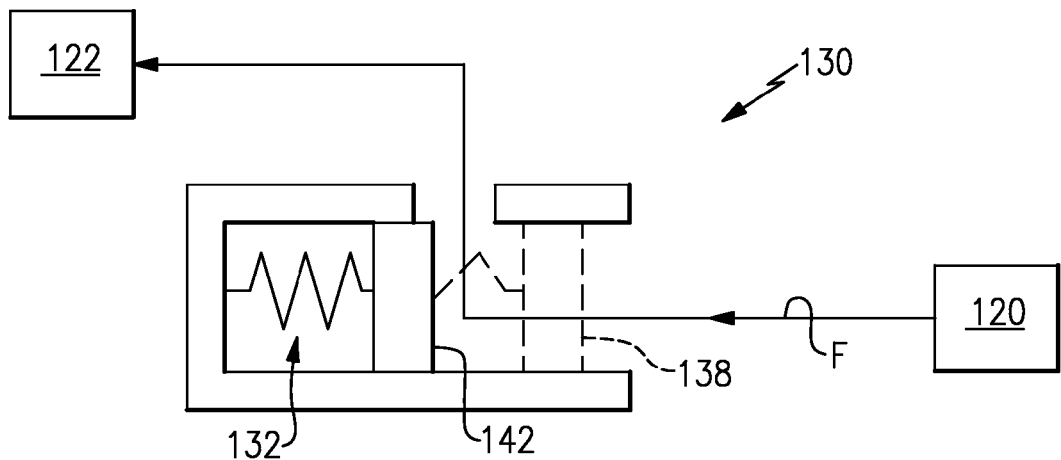
FIG. 10 shows an example valve assembly for use within the FIG. 8 arrangement.
Figure 11:
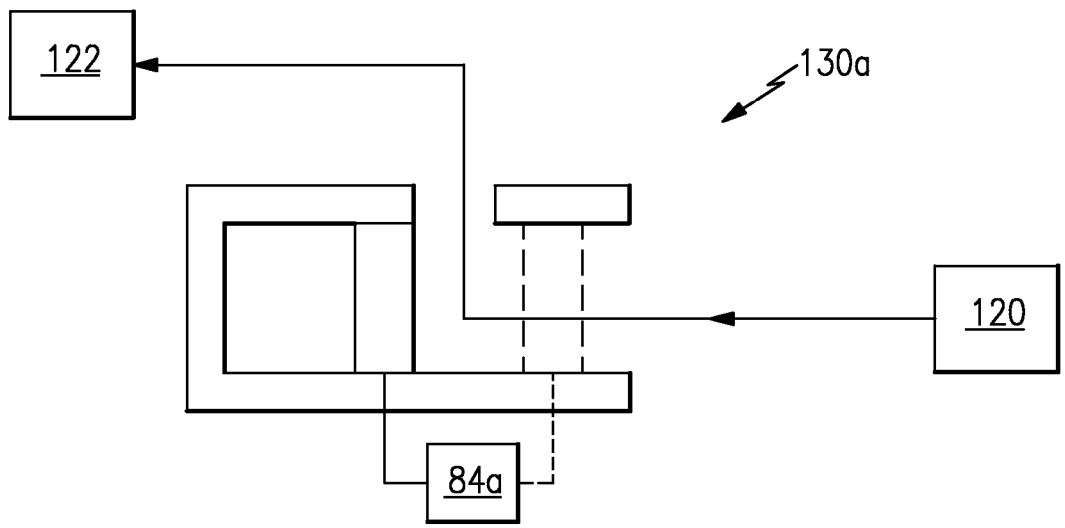
FIG. 11 shows another example valve assembly for use within the FIG. 8 arrangement.

Referring to FIGS. 10 and 11 with continuing reference to FIGS. 8 and 9, in one example, the valve 130 includes a biasing member 132. The biasing member 132 is configured to bias the valve 110 toward a restrictive flow position 138. When the pressure in the working pressure area 120 of the hydraulic log 58 increases to a certain level, the pressure overcomes the biasing force exerted by the biasing member 132 and causes the valve 110 to move to a less restrictive flow position 142. The less restrictive flow position 142 permits more hydraulic fluid to move from the higher pressure area 120 of the hydraulic log 58 to the low pressure area 122 than when the valve 110 is in the more restrictive flow position 138. When the valve 130 is in the less restrictive flow position 142, hydraulic fluid continues to move from the working pressure area 120 to the lower pressure area 122 until the pressure in the working pressure area 120 drops to a point below the biasing force of the biasing member 132.

When the valve 130 is in the more restrictive position 138, hydraulic fluid still may move through the openings 118. Using the valve 130 in conjunction with the hydraulic log 58 effectively increases the area that permitting flow between the various areas of the hydraulic log 58. As appreciated, pressure differentials between working pressure area 120 and the low pressure area 122 provide the relative adjustments in rotational speed and torque.

The positioning of wobbler plates 94 and 90 dictates the portion of the hydraulic log 58 that is the working pressure area 120 or the low pressure area 122. In one example, the wobbler plates 90 and 94 are alternated between a fully opened and a fully closed position depending on whether the motor generator 54 is driving the input shaft 48, or whether the input shaft 48 is driving the motor generator 54. The finer adjustments in the relative speeds and regulating working pressure are then accomplished utilizing the valve 130.

In the example of FIG. 11, the valve 130a is a solenoid valve that is operatively linked to the controller 84a. The controller 84a adjusts the positioning of the solenoid valve to permit a desired amount of flow through the valve 130, thus actively controlling the working pressure and speed.

Features of the disclosed examples include using a motor-generator to start an engine and to provide electric power to the engine during different modes of operation. Another feature includes a lower weight and lower cost design when compared to other motor-generator options.

Features of the disclosed examples include a hydraulic log that gains torque between a zero speed and a peak torque point of a standard SDG. The control of the SDG is simplified relative to other designs.

Although an example embodiment has been disclosed, a worker of ordinary skill in this art would recognize that certain modifications would come within the scope of the claims. For that reason, the following claims should be studied to determine their true scope and content.

We claim:

1. A hydraulic log valve assembly, comprising:
a valve that controls a flow of fluid within a hydraulic log to provide a rotational output from the hydraulic log that is different than a rotational input to the hydraulic log, the hydraulic log including a first wobbler plate to adjust a stroke of a first plurality of pistons, and a second wobbler plate to adjust a stroke of a second plurality of pistons, at least one of the first wobbler plate and the second wobbler plate adjustable from a first position where a portion of the first wobbler plate or second wobbler plate is tilted to a first side of a radial axis and a second position where the portion is tilted to an opposite second side of the radial axis, wherein the valve adjusts to control the flow of fluid between a higher pressure area of the hydraulic log and a lower pressure area of the hydraulic log, the first wobbler plate and the second wobbler plate adjusted independently from the valve; and
a port plate, the first wobbler plate disposed on a first side of the port plate, the second wobbler plate disposed on an opposing second side of the port plate, the port plate having a first opening to permit flow from the first side to the second side, and a second opening to permit flow from the second side to the first side,
wherein the first opening is in a higher pressure area of the hydraulic log and the second opening is in a lower pressure area of the hydraulic log,
wherein the valve selectively permits flow from the higher pressure area to the lower pressure area.

2. The hydraulic log valve assembly of claim 1, wherein the valve comprises a biasing member.

3. The hydraulic log valve assembly of claim 1, wherein the valve comprises a solenoid.

4. The hydraulic log valve assembly of claim 1, wherein the hydraulic log rotatably couples a turbomachine rotor and a motor-generator.

5. The hydraulic log valve assembly of claim 1, wherein the hydraulic log includes a plurality of pistons each having a stroke that is adjusted with the first wobbler plate to provide the rotational output from the hydraulic log that is different than the rotational input to the hydraulic log.

6. The hydraulic log valve assembly of claim 5, wherein the hydraulic log further includes a second plurality of pistons within the hydraulic log assembly, and a stroke of the second plurality of pistons is configured to be adjusted with the second wobbler plate to provide the rotational output from the hydraulic log that is different than the rotational input to the hydraulic log.

7. The hydraulic log valve assembly of claim 5, wherein the valve is adjusted by a controller to selectively control flow of fluid within the hydraulic log.

8. The hydraulic log valve assembly of claim 1, wherein the hydraulic log assembly is rotatably coupled to a motor-generator that has a motor mode of operation and a generator mode of operation, wherein the motor-generator is configured to drive an input shaft through the hydraulic log assembly when the motor-generator is in the motor mode of operation, and the input shaft is configured to drive the motor-generator through the hydraulic log assembly when the motor-generator is in the generator mode of operation.

9. The hydraulic log valve assembly of claim 8, wherein the valve is configured to adjust the rotational input from the motor-generator to drive the input shaft when the motor-generator is in the motor mode of operation.

10. The hydraulic log valve assembly of claim 8, wherein the valve is configured to adjust the rotational input from the input shaft to provide a rotational output that drives the motor-generator when the motor-generator is in the generator mode of operation.

11. A gas turbine engine assembly, comprising:
a motor-generator;
a compressor rotor;
a hydraulic log that receives a rotational input from one of the motor-generator or the compressor rotor, and provides a rotational output to the other of the motor-generator or the compressor rotor;
a valve that adjusts to control the flow of fluid between a higher pressure area of the hydraulic log and a lower pressure area of the hydraulic log to selectively adjust the speed of the rotational output relative to the speed of rotational input,
the hydraulic log including a first wobbler plate to adjust a stroke of a first plurality of pistons, and a second wobbler plate to adjust a stroke of a second plurality of pistons, at least one of the first wobbler plate and the second wobbler plate adjustable from a first position where a portion of the first wobbler plate or second wobbler plate is tilted to a first side of a radial axis and a second position where the portion is tilted to an opposite second side of the radial axis, wherein the valve controls the flow of fluid to adjusts the speed of the rotational output relative to the rotational input independently from the first and second plurality of pistons, the first wobbler plate and the second wobbler plate adjustable independently from the valve; and a port plate, the first wobbler plate disposed on a first side of the port plate, the second wobbler plate disposed on an opposing second side of the port plate, the port plate having a first opening to permit flow from the first side to the second side, and a second opening to permit flow from the second side to the first side, wherein the first opening is in the higher pressure area of the hydraulic log and the second opening is in the lower pressure area of the hydraulic log, wherein the valve selectively permits flow from the higher pressure area to the lower pressure area.

12. The gas turbine engine assembly of claim 11, wherein the hydraulic log comprises a first plurality of pistons and a second plurality of pistons, the first and the second plurality of pistons configured to selectively adjust the speed of the rotational output relative to the rotational input.

13. A method of driving components within a turbomachine, comprising:
  providing a first rotational input to a hydraulic log using a motor-generator when the motor-generator is in a motor mode of operation; and
  using a valve that controls flow within a hydraulic log to adjust the first rotational input relative to a second rotational input that drives a compressor rotor, the hydraulic log including a first wobbler plate to adjust a stroke of a first plurality of pistons, and a second wobbler plate to adjust a stroke of a second plurality of pistons, at least one of the first wobbler plate and the second wobbler plate adjustable from a first position where a portion of the first wobbler plate or second wobbler plate is tilted to a first side of a radial axis and a second position where the portion is tilted to an opposite second side of the radial axis, wherein the first wobbler plate is disposed on a first side of a port plate, and the second wobbler plate is disposed on an opposing second side of the port plate;
  using the valve to control flow within the hydraulic log to adjust the first rotational input relative to the second rotational input without adjusting a position of the first wobbler plate or a position of the second wobbler plate;
  moving flow through a first port plate opening from a first side to an opposing, second side of a port plate;
  moving flow through a second port plate opening from the second side to the first side, the first opening in a higher pressure area of the hydraulic log than the second opening; and
  selectively adjusting flow between the higher pressure area and the lower pressure area using the valve, the valve an adjustable valve that is separate and distinct from both the first opening and the second opening.

14. The method of claim 13 further including,
  providing a third rotational input to the hydraulic log using the compressor rotor when the motor-generator is in a generator mode of operation; and
  using the valve that controls flow within the hydraulic log to adjust the third rotational input and to provide a fourth rotational input that drives the motor-generator;
  wherein the hydraulic log comprises more than one wobbler plate.

15. The method of claim 13, wherein the using of the valve further comprises biasing the valve away from a flow permitting position to a flow restricting position via a biasing member, the biasing member biasing the valve toward a more restrictive flow position when pressure within the higher pressure area of the hydraulic log is below a threshold value, wherein pressure at or above the threshold value overcomes a biasing force of the biasing member to move the valve to a less restrictive flow position.

16. The hydraulic log valve assembly of claim 1, wherein the valve includes a biasing member that biases the valve toward a more restrictive flow position when pressure within the higher pressure area of the hydraulic log is below a threshold value, wherein pressure at or above the threshold valve overcomes a biasing force of the biasing member to move the valve to a less restrictive flow position.

17. The hydraulic log valve assembly of claim 1, wherein the valve is separate and distinct from the first opening and the second opening.

* * * * *